United States Patent

Li

[11] Patent Number: 6,132,172
[45] Date of Patent: Oct. 17, 2000

[54] WINDMILL

[76] Inventor: Wan-Tsai Li, No. 4-9, Shetzu Village, HsinWu, TaoYuan, Taiwan

[21] Appl. No.: 09/326,633

[22] Filed: Jun. 7, 1999

[51] Int. Cl.[7] .................................. F03D 1/02; F03D 7/02
[52] U.S. Cl. .............................. 416/11; 416/13; 416/110; 416/117; 416/176; 416/177; 416/175; 416/201 A; 416/244 R; 415/4.3; 415/4.5
[58] Field of Search .................................. 416/10, 11, 13, 416/16, 110, 117, 176, 176 A, 177, 175, 200 A, 188, 201 A, 200 R, 244 R; 415/4.3, 4.5, 908, 4.1, 4.2, 4.4

[56] References Cited

U.S. PATENT DOCUMENTS

| | | | |
|---|---|---|---|
| 188,020 | 3/1877 | Manley | 416/176 A |
| 226,036 | 3/1880 | Colvin | 416/10 |
| 470,910 | 3/1892 | Clemens | 416/10 |
| 555,806 | 3/1896 | Dolsen | 415/4.5 |
| 1,342,206 | 3/1920 | Hansen-Ellehammer | 416/11 |
| 1,868,047 | 7/1932 | Constantin | 416/10 |
| 2,026,828 | 1/1936 | Dunn | 416/10 |
| 2,484,291 | 10/1949 | Hays | 416/11 |
| 3,228,475 | 1/1966 | Worthmann | 416/188 |
| 4,218,175 | 8/1980 | Carpenter | 415/4.5 |
| 5,137,417 | 8/1992 | Lund | 416/13 |

*Primary Examiner*—F. Daniel Lopez
*Assistant Examiner*—James M McAleenan
*Attorney, Agent, or Firm*—Dougherty & Troxell

[57] ABSTRACT

An improved windmill includes a conical rotor unit, a frame for supporting the conical rotor unit and a base for supporting the frame. The conical rotor unit has a conical rotor with a plurality of spaced curved blades disposed thereon and a plurality of spaced slant blades located at an outer rim of the conical rotor. The conical rotor has small wind resistance and may rotate under low speed wind to generate rotor rotation. The frame is rotationable about the base to enable the conical rotor to capture wind from different directions. The conical rotor is heavier than conventional windmill rotor and may serve as a fly wheel to store kinetic energy for the windmill to produce steady rotation under different wind speed for a long period of time.

1 Claim, 5 Drawing Sheets

WINDMILL

BACKGROUND OF THE INVENTION

1. Field of the Invention

This invention relates to a windmill and particularly to a windmill that is operationable at a low speed wind and has a fly wheel function for rotating long time steadily.

2. Description of the Prior Art

Traditional windmills have many limitations and restrictions. For instance, they need relatively high speed wind to start operation, have low operating efficiency and low utilization (i.e., usable only in small number of days in a year that have high enough wind speed for windmill operation), etc. There are still a lot of room for improvement in the windmill design and structure to make it more practical and useful.

SUMMARY OF THE INVENTION

It is an object of this invention to provide an improved windmill that is operationable at a low speed wind and has small resistance in high speed wind for achieving greater utilization and higher efficiency. It is another object of this invention to provide an improved windmill that has a built-in fly wheel function which may store kinetic energy to produce steady rotation in different wind speed for a long time period.

According to one aspect of this invention, the windmill includes a conical rotor unit which has curved blades and outer slant blades located thereon to capture wind force, a frame for supporting the conical rotor unit and a base to support the frame. The curved and outer slant blades may capture wind force even at low speed. The conical rotor may double as a fly wheel to store kinetic energy for producing steady windmill rotation for a long time period. The frame is rotationable about the base for capturing wind from different directions. All these features make this windmill more effective and efficient than conventional ones.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

This invention aims at providing an improved windmill that may produce steady rotation under various wind speed so that it may achieve high utilization and increased efficiency.

Figure 1:
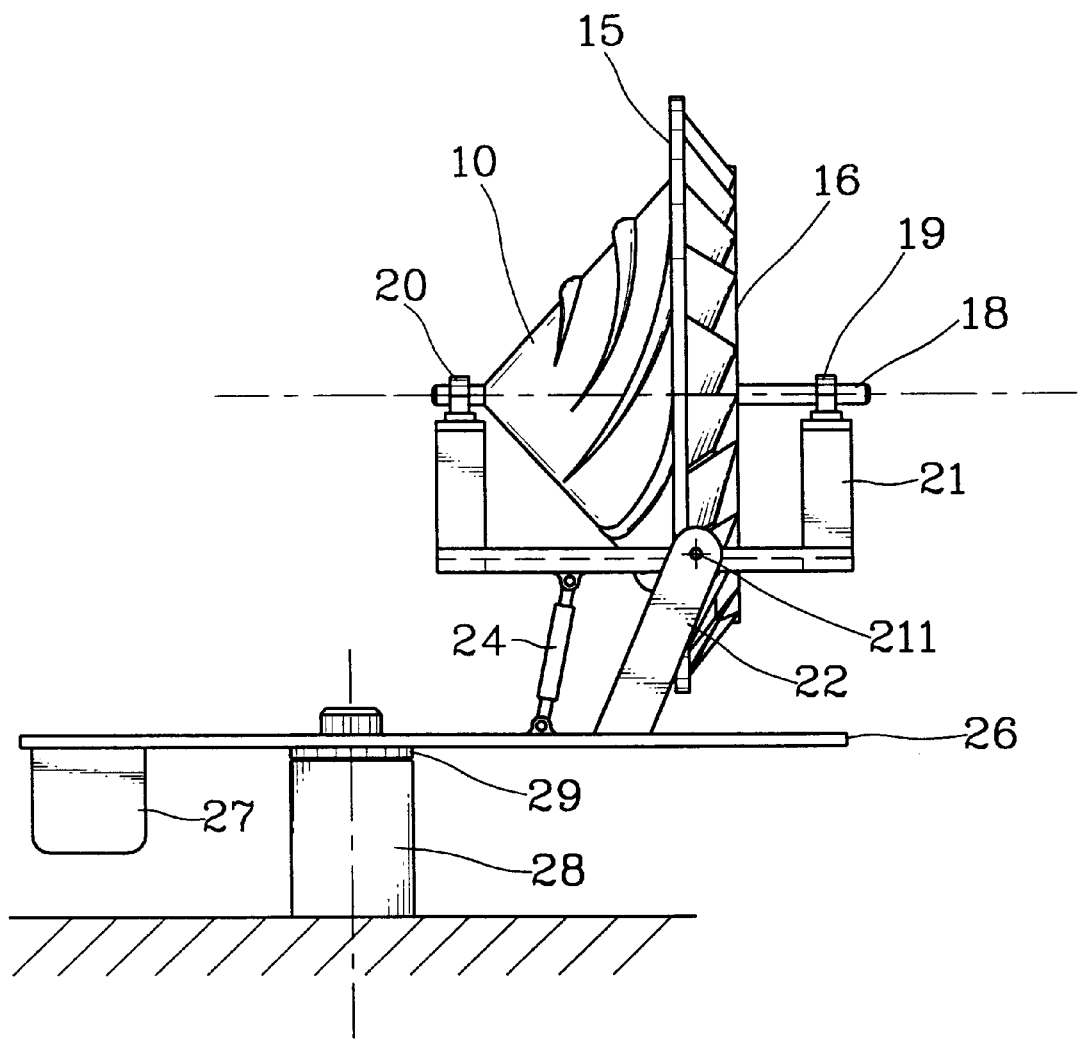
FIG. 1 is a side view of this invention.
Figure 2:
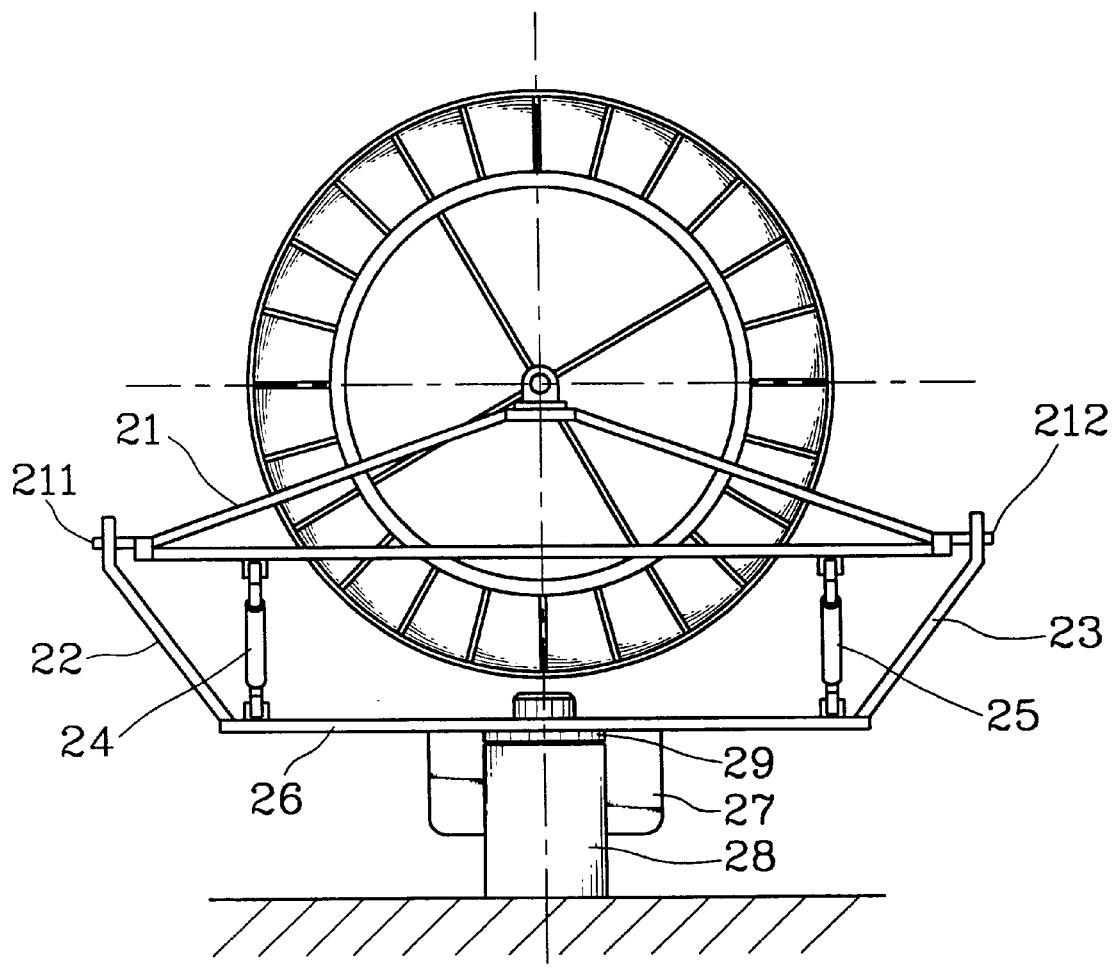
FIG. 2 is a back view of this invention.
Figure 3:
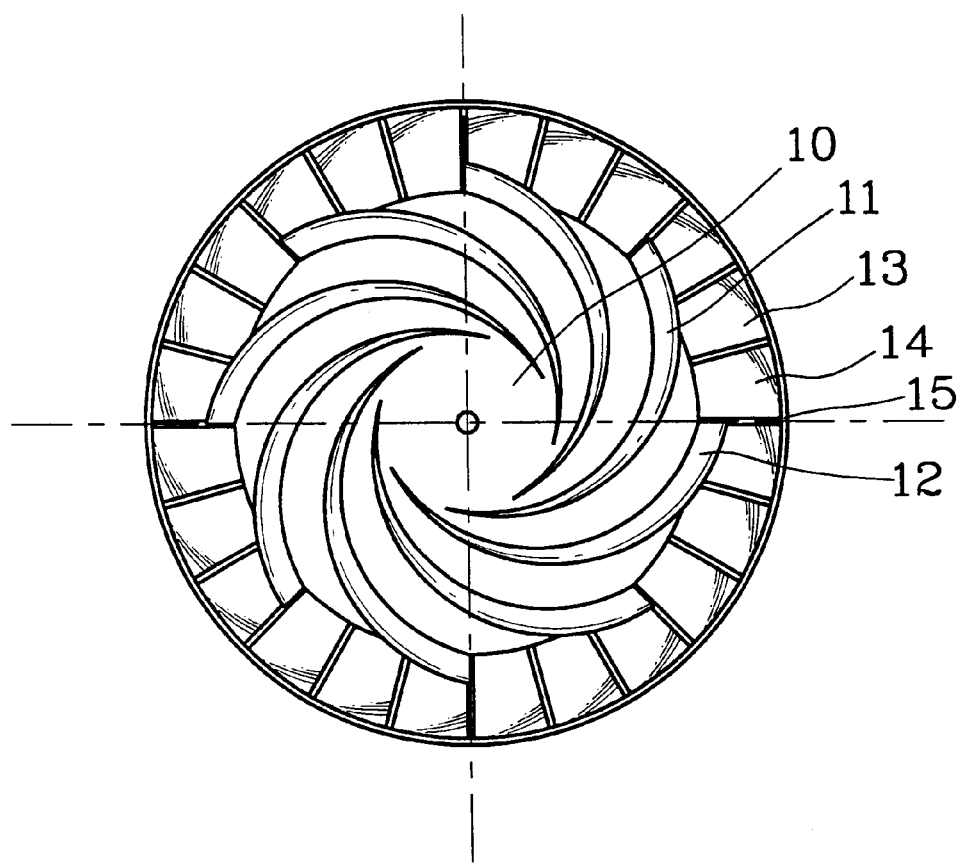
FIG. 3 is a top view of a conical rotor unit of this invention.
Figure 4:
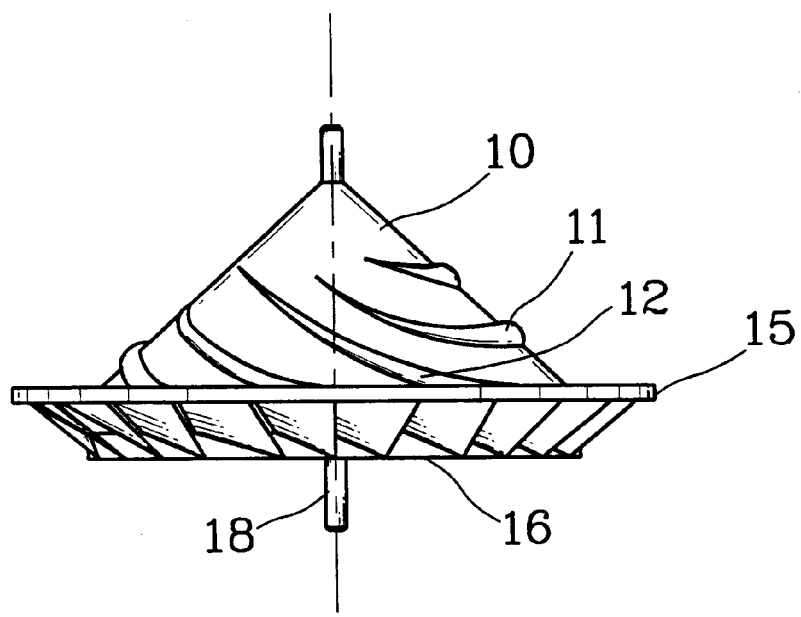
FIG. 4 is a side view of a conical rotor unit of this invention.
Figure 5:
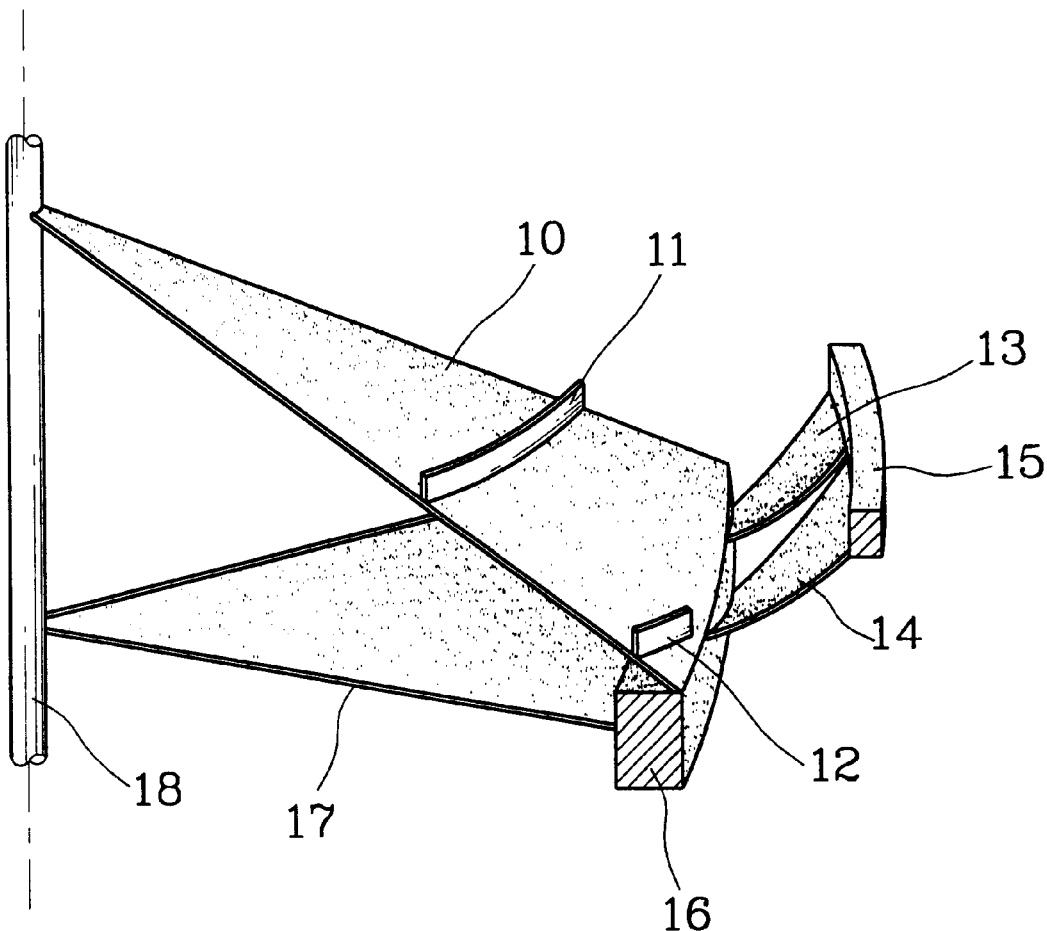
FIG. 5 is a fragmentary perspective view of a conical rotor unit of this invention.
Figure 6:
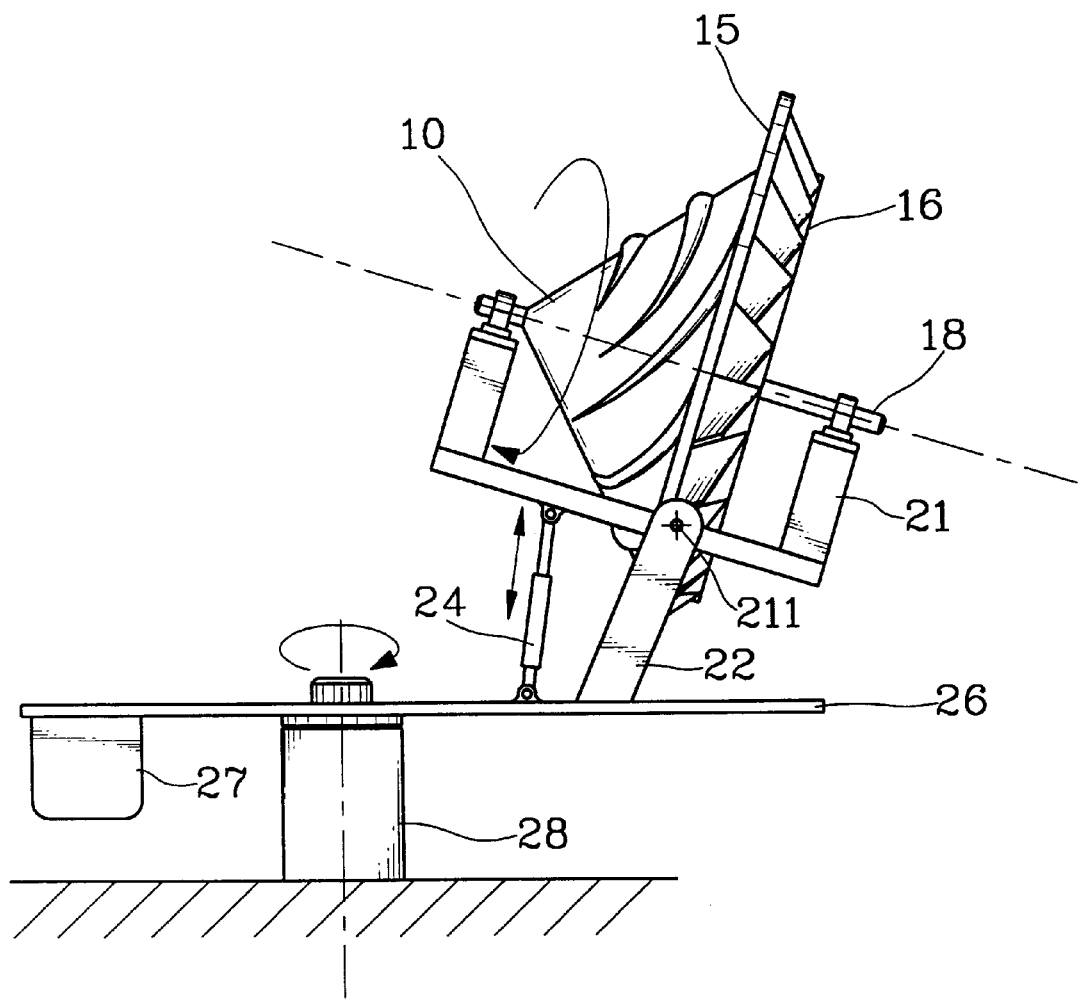
FIG. 6 is a pictorial view of this invention in use, under strong wind environment.

Referring to FIGS. 1 and 2, the windmill according to this invention includes a conical rotor unit, a frame and a base. The conical rotor unit (also referring to FIGS. 3 and 4) has a conical rotor 10 upon which a plurality of spaced curved blades 11 and 12 are soldered (or riveted) thereon. Each of the blades 11 and 12 is spiral-shaped, and has a taper end in the center portion of the conical rotor and a wide edge when reaching a circumferential cone ring 16 of the conical rotor. The cone ring 16 is supported by bars 17 at one end. The bars 17 have another ends mounted on a cone shaft 18 (also referring to FIG. 5). There are a plurality of outer slant blades 13 and 14 fixed to outside rim of the cone ring 16 at one end. The slant blades 13 and 14 are bordered by an outer ring 15 at another end thereof, and are located above the cone ring 16.

The frame includes a pair of spaced triangle brackets 21 (FIGS. 1 and 2) supported by a pair of spaced arms 22 and 23 which in turn are mounted on a flat board 26 at one end thereof. The flat board 26 is mounted on a plane bearing 29 seated on the top of a base axis 28. There is a counter balance weight 27 at another end of the flat board 25 so that the conical rotor unit and the frame which are located at one end of the flat board may rotate about the base axis 28 horizontally to capture wind from different directions.

The conical rotor 10 is supported by a pair of bearings 19 and 20 (FIG. 1) located on the top of the brackets 21 through the cone shaft 18. The brackets 21 have two short spindles 211 and 212 (FIG. 2) at two sides and are pivotly mounted on the arms 22 and 23. There are a pair of spaced spring rods 24 and 25 which have one end pivotally mounted on the flat board 26 and another end engaged with the brackets 21 so that the conical rotor unit and the frame may tilt an angle under strong wind speed to reduce wind receiving area to avoid over speed rotation or damage.

When in use, the curved blades 11, 12 on the conical surface and the slant blades 13 and 14 may capture even a low speed wind and convert it to rotor rotation. The spiral shape blades 11 and 12 has small wind resistance, and thus may offer greater efficiency.

As the conical rotor unit is heavier than conventional windmill rotor, it has a fly wheel effect for storing kinetic energy. Therefore the conical rotor of this invention may produce relatively steady rotation under different wind speed for a long period of time. The flat board 26 may rotate horizontally to capture wind from different directions. Under strong wind speed, the spring rods 24 and 25 may extend and tilt the conical rotor and the frame at an angle to compensate the wind force to avoid damage resulting from too speedy rotation. The spring rods 24 and 25 may contract and move the conical rotor and the frame to a normal position when strong wind subsides.

Experiments show that with a windmill embodiment according to this invention weighing 250 kg, the windmill may start rotation at a wind speed of 2.5 meter per second. When wind speed is 3 meter/sec, it may drive a 600c.c. air cylinder at 18 RPM for work. At wind speed of 6 meter/sec, the rotation speed may increase to 60 RPM. Its utilization and application for electricity generation and heat generation is now under testing.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A windmill, comprising;

a conical rotor unit including a conical rotor, a plurality of spaced curved blades attached on the conical rotor, surface, a plurality of outer slant blades and a cone shaft, the curved blades having one end adjacent a cone ring at a circumference of the conical rotor, the outer slant blades having one end slantly fixed to the cone ring at a slant direction coinciding with curvature of the curved blades and another end thereof engaged with an outer ring located radially outside the cone ring;

a frame having a pair of triangle brackets supporting the conical rotor unit on the cone shaft, two short spindles at two sides thereof for supporting the brackets through two arms mounted on a flat board, a counter balance weight located at one end of the flat board for balancing the weight of the conical rotor unit, and a pair of spaced spring rods having one end thereof engaging with the flat board and another end thereof engageable with the brackets, and a base having a bearing for supporting the flat board and the conical rotor unit.

* * * * *